United States Patent [19]

Lyons

[11] Patent Number: 5,704,988
[45] Date of Patent: Jan. 6, 1998

[54] FLEXIBLE "THROW-AWAY" SHEET OF TROUGH FOR WET REMOVAL OF ASBESTOS

[76] Inventor: William G. Lyons, 34 Freemans Bridge Rd., Scotia, N.Y. 12302

[21] Appl. No.: 422,959

[22] Filed: Apr. 17, 1995

[51] Int. Cl.⁶ .................................................. B08B 15/02
[52] U.S. Cl. ........................... 134/10; 134/183; 134/200; 312/1
[58] Field of Search .................................. 134/201, 198, 134/200, 182, 183, 10, 92; 15/104.04; 312/1

[56] References Cited

U.S. PATENT DOCUMENTS

| | | | |
|---|---|---|---|
| 4,626,291 | 12/1986 | Natale | 312/1 |
| 4,746,175 | 5/1988 | Hamlet et al. | 312/1 |
| 4,783,129 | 11/1988 | Jacobson | 312/1 |
| 4,800,908 | 1/1989 | Lyons | 15/104.04 |
| 4,803,771 | 2/1989 | Lyons | 15/104.04 |
| 4,815,488 | 3/1989 | Lyons | 15/104.04 |
| 4,820,000 | 4/1989 | Jacobson | 312/1 |
| 4,821,397 | 4/1989 | Lyons | 312/1 |
| 4,842,347 | 6/1989 | Jacobson | 312/1 |
| 4,865,401 | 9/1989 | Jacobson | 312/1 |
| 4,883,329 | 11/1989 | Flannery et al. | 312/1 |
| 4,901,743 | 2/1990 | Hittler | 312/1 |
| 4,911,191 | 3/1990 | Bain | 312/1 |
| 4,912,358 | 3/1990 | Vitta | 312/1 |
| 4,934,763 | 6/1990 | Jacobons | 312/1 |
| 4,960,143 | 10/1990 | Dore, Jr. et al. | 312/1 |
| 4,996,999 | 3/1991 | Bartimore | 312/1 |
| 5,062,871 | 11/1991 | Lemon, III | 312/1 |
| 5,147,242 | 9/1992 | Lowe, Jr. | 312/1 |
| 5,342,121 | 8/1994 | Koria | 312/1 |
| 5,607,504 | 3/1997 | Coleman, III | 134/172 |

*Primary Examiner*—Frankie L. Stinson
*Attorney, Agent, or Firm*—Jerome J. Norris

[57] ABSTRACT

A trough soaking device for use in a process for complete wet removal of asbestos insulation covering from pipes, joints, and valves comprising: a flexible waterproof sheet material having disposed at its shortest ends a strip of sealing means for placement about pre-formed outermost adherent contact points on an asbestos covered pipe, and sleeve means at its longest ends to accommodate insertable support rods; a pair of support rods for insertion into a portion of said sleeve means; and at least a pair of saddles containing arched-out semi-circles for placement over pre-formed innermost adherent contact points on an asbestos covered pipe; said saddles containing slot means disposed at its lengthwise ends to accommodate press-fitting of support rods disposed in said sleeve means when said sealing means of said shortest ends of said waterproof sheet material are sealed together over said pre-formed outermost adherent contact points on said asbestos covered pipe.

9 Claims, 2 Drawing Sheets

FLEXIBLE "THROW-AWAY" SHEET OF TROUGH FOR WET REMOVAL OF ASBESTOS

FIELD OF THE INVENTION

The invention relates to flexible "throw-away" trough sheet devices for use in a process for wet removal of asbestos insulation or other hazardous materials from pipes and pipe joints of various shapes, disposed horizontally, vertically or otherwise. Use of these flexible, light-weight, "throw-away" waterproof sheets in the form of troughs is possible due to affecting better seal means between the flexible trough sheets and the asbestos covered pipe, and the asbestos insulation is easily and safely removed with greater reduction in labor costs than heretofore known when using either the more rigid prior art troughs or prior art glove bag removal methods for removing asbestos without the risks of friable particles escaping into the air.

BACKGROUND OF THE INVENTION

Asbestos has been used for pipe insulation, and this specific insulation has been applied to pipes in the forms of preformed fibrous asbestos wrapping, asbestos fiber felt, insulated cement, corrugated paper and in mixtures of magnesia with asbestos. The applied asbestos insulating material is generally covered with a protective jacket made of cloth, paper or cement. In some instances, the asbestos insulation is covered with tape or millboard.

However, asbestos has been found to be harmful to human beings and its fields of application are either being eliminated or increasingly restricted. The reason is that asbestos adheres in the lungs upon inhalation and spreads to other parts of the body, and becomes, among other things, a known carcinogen. In view of these known risks of asbestos as a health hazard, public officials have required the removal of asbestos insulation materials that have been applied in: the construction field; heating insulation; partition walls; fire retarding materials in floor structures, etc.

During the removal of asbestos, the area of removal is generally sealed off and the asbestos is sucked into containers from which the dust-like asbestos particles are removed and packed into plastic bags. The bags are taken to garbage stations where they are stored or buried. However, during these handling operations there is a risk that the asbestos will escape from the bags, either when the asbestos is being filled into the bags or during transport if a bag is damaged.

In the case where large amounts of asbestos are transported to garbage stations, water is poured over the asbestos to prevent dust formation.

However, because of the health risks posed by dust, sealing off or containment of the work area from which asbestos is to be removed is essential, and such containment requires construction of barriers with plastic sheets joined with folded seams and sealing tape at the seams and boundaries. Moreover, air locks and worker decontamination facilities equipped with showers must be employed with a negative air pressure system and used in concert with the sealing off or containment method, and abatement or removal activities are generally carried out during vacations or at times when few people are in the premises, in order to reduce risks.

In these circumstances, it is well known that the cost of containment can often times exceed the cost of the actual abatement. Further, in these containment procedures for asbestos abatement or removal, the worker is still required to enter the containment area in order to remove the asbestos.

In the area of asbestos containment, it is also known that, during removal of asbestos insulation coverings from pipes and valves, the operation is attendant with risks because of the tendency for remnants or small asbestos fibers to remain intact around the pipes and valves, and become airborne, either during removal or at a later point in time after the removal operation is finished.

U.S. Pat. No. 4,996,999 discloses a rectangular piece of apparatus for removing asbestos having a work zone therein, as can best be seen in FIG. 1. The work zone has an opening to enable access into the work zone from a position external to the work zone. The rectangular apparatus further includes spray means mounted to the main body and connected to a fluid source. The spray means have a plurality of spray heads to wet a section of an asbestos covered pipe contained within the work zone, prior to removing asbestos by vacuum action.

Apparatus for removing asbestos insulation in which a pipe delivers a fluid such as a surfactant to nozzles, which are injectable into the asbestos prior to commencing the wetting action is disclosed in U.S. Pat. No. 5,085,237.

U.S. Pat. No. 4,934,763 discloses a glove box for removal of hazardous waste such as asbestos from different pipe configurations. The hazardous waste box has a pair of upper, optically clear, flexible, and rigid walls which are mounted to be opened for placement over at least a portion of the pipe configuration, and the box may be removed along all or only a portion of the pipe configuration.

A portable containment device for stripping and receiving cladding material from an elongated body is disclosed in U.S. Pat. No. 4,912,358. The containment device for removal of asbestos insulation from the elongated pipe is characterized by sealing means for containment of the device, as can be seen in FIGS. 2 and 6.

U.S. Pat. No. 4,960,143 discloses containment apparatus for stripping hazardous materials such as asbestos from pipes. The apparatus comprises a housing having end walls provided with openings to accommodate a length of pipe. The housing further has hinged walls which enable the housing to be applied to and removed from the pipe when desired.

Apparatus for removing asbestos from pipes, in which a box-like device includes a lower portion having a periphery, and a continuous side wall extending upwardly from the periphery of the lower portion to define an enclosure therebetween is disclosed in U.S. Pat. No. 4,809,391. The side wall of the device has an upper edge with two pairs of opposing recesses formed orthogonally with respect to each other in the upper edge of the continuous side wall for receiving the pipes.

U.S. Pat. No. 4,800,908 discloses taped troughs for wet removal of asbestos from pipes, wherein the trough device comprises rigid side walls containing port-hole slots or openings through which support bars are inserted to support the troughs on an asbestos covered pipe. Tape is used to adhere or secure the end walls of the trough to the asbestos covered pipes.

While the prior art devices provide improvement in the area intended, there still exists a need for an improved process for removing asbestos using troughs that are more flexible, lighter in weight, less rigid, more easily secured to the asbestos covered pipe, and thereby allowing the costs for removal of asbestos from pipes to be significantly reduced.

One object of the present invention is to provide a more flexible taped trough means for easy and safe complete wet removal of asbestos insulation and other hazardous materials from pipes, joints and valves, by providing an adherent material on at least four contact points of the asbestos covered pipe prior to installation of the lightweight, flexible, "throw-away" trough sheet.

Another object of the invention is to provide a more flexible taped trough means for easy and safe complete wet removal of asbestos insulation from pipes by placing over the two adherent outer contact points on the asbestos covered pipe prior to installation of the lightweight flexible "throw-away" trough sheet, a material having two adherent sides.

A yet further object of the invention is to provide a more flexible taped trough means for easy and safe complete wet removal of asbestos insulation from pipes by placing over the two adherent innermost contact points on the asbestos covered pipe prior to installation of the lightweight, flexible, "throw-away" trough sheet, a tape having two adherent sides.

A still further object of the invention is to provide a more flexible taped trough means for easy and safe complete wet removal of asbestos insulation from pipes by inserting support rods into a sleeve openings on each side of a waterproof sheet material, and centering each support rod an equal distance between strips of two-sided tape attached along both inside edges of the waterproof sheet material.

A further object yet still of the invention is to provide a more flexible taped trough means for easy and safe complete wet removal of asbestos insulation from pipes by placing a piece of two-sided tape along the inside radius of an arched-out semi-circle in at least two saddles which fit on the asbestos covered pipe, to reduce the risk of the saddle and trough rotating on the asbestos covered pipe when the trough is filled with water.

A further object even still of the invention is to provide a more flexible taped trough means for easy and safe complete wet removal of asbestos insulation from pipes by pressing one sheet covered support rod into a slot in both saddles, positioning the inside radius of an arched-out semi-circle in each saddle to fit over the two innermost adherent spots on the asbestos covered pipe, removing the covering from the two-sided tape previously attached to the inside radius of the arched-out semi-circle in each saddle, placing the saddles on top of the innermost two-sided adherent spots, removing the covering off of the two-sided tape on the inside edges of the flexible trough sheet, and placing the two-sided tape on the inside edges of the trough over the two-sided tape of the outermost contact points on the asbestos covered pipe, to provide a secure seal of the flexible trough sheet ends to the asbestos covered pipe.

A yet still further object of the invention is to provide a more flexible taped trough means for easy and safe complete wet removal of asbestos insulation from pipes by: placing a sufficient volume of water containing an emulsifier into the sealed, in place, lightweight, flexible, "throw-away" trough sheet to completely immerse the asbestos covered pipe; soaking the asbestos covered pipe for a period sufficient to loosen the asbestos; slitting the asbestos covering longitudinally along the pipe length to allow the asbestos to fall-off into the trough; vacuuming or siphoning off excess water so that only soaked asbestos remains; dislodging the saddles; removing any tape residue; wiping the saddles clean and preserving them for future use; and dropping the trough containing the removed asbestos into a waste bag.

A further object yet still of the present invention is to remove the more flexible taped trough sheet means containing the soaked asbestos by longitudinally slitting the bottom of the trough from the inside to allow the soaked asbestos contents to drop or be pushed directly into a disposal bag, followed by wiping the side and inside of the slit trough clean with a rag, after which the saddles and rods are removed from the empty trough, wiped clean and preserved for future use. Each sealed end of the trough sheet is then cut away from the pipe, and both the empty trough and rags are deposited in the disposal bag.

These and other objects of the invention will become more apparent from the disclosure, and detail descriptions hereinafter set forth.

SUMMARY OF THE INVENTION

In accordance with the present invention, improved flexible taped trough means for easy and safe complete wet removal of asbestos insulation and other hazardous materials from pipes are obtained by immersing the asbestos covered pipes in an aqueous solution in order to facilitate easy and complete removal of the aqueous solution saturated asbestos fibers, without the risk of asbestos fibers escaping into the environment or atmosphere.

Towards these ends, and in the case of a horizontally disposed asbestos insulated pipe, a flexible, waterproof "throw-away" sheet trough is positioned around an asbestos covered pipe by: providing an adherent material on at least four contact points on the asbestos covered pipe prior to installation of the lightweight, flexible, "throw-away" trough sheet material; placing over the two adherent covered outermost contact points on the asbestos covered pipe prior to installation of the lightweight flexible "throw-away" trough sheet material, a tape having two adherent sides; placing over the two adherent covered innermost contact points on the asbestos covered pipe prior to installation of the lightweight flexible, "throw-away" trough sheet material, a tape having two adherent sides; inserting one support rod into a sleeve opening on each side of the trough sheet by centering each support rod an equal distance between strips of two-sided tape attached along both inside edges of the trough sheet; placing a piece of two-sided tape along the inside radius of an arched-out semi-circle in at least two saddles which are to be fitted on the asbestos covered pipe, to reduce the risk of the saddle and trough rotating on the asbestos covered pipe when the trough is filled with water; pressing one trough covered support rod into a slot in both saddles; positioning the inside radius of an arched-out semi-circle in each saddle to fit the two innermost adherent contact points or spots on the asbestos covered pipe (covered with two-sided sticky or tacky tape); removing the covering from the two-sided tape previously attached to the inside radius of the arched-out semi-circle in each saddle; placing the saddles on top of the innermost two-sided tape spots; removing the covering off of the two-sided tape on the inside edges of the flexible trough; and placing the two-sided tacky tape on the inside edges of the trough over the two-sided tape of the outermost contact points on the asbestos covered pipe to provide a secure seal of the flexible trough sheet ends to the asbestos covered pipe.

The method of removing the asbestos is accomplished by placing a sufficient volume of water containing an emulsifier into the sealed, in place, lightweight, flexible, "throw-away" trough to completely immerse the asbestos covered pipe; soaking the asbestos covered pipe for a period sufficient to loosen the asbestos; slitting the asbestos covering longitudinally along the pipe length to allow the asbestos to fall-off into the trough; and vacuuming or siphoning off excess water so that only soaked asbestos remains in the flexible trough for disposal.

DETAILED DESCRIPTION OF THE INVENTION

Figure 1:
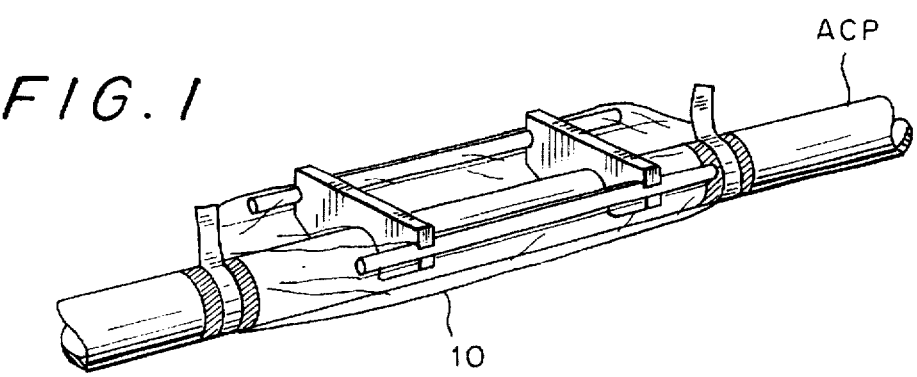
FIG. 1 is a perspective view showing a completely assembled flexible, waterproof "throw-away" trough sheet sealed about an asbestos covered pipe.
Figure 2:
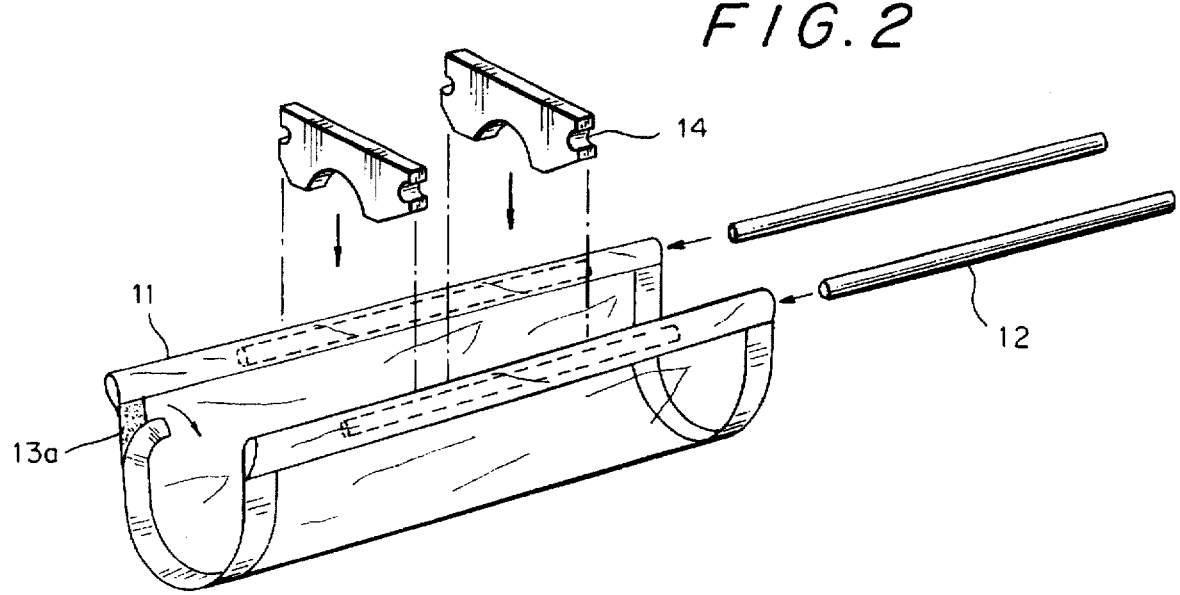
FIG. 2 is an exploded view in perspective showing the flexible, lightweight trough containing sheet with sleeve openings on each side, the two support rods insertable in the sleeves, and the two saddles containing the arched-out semi-circles which fit over two innermost adherent contact points on the asbestos covered pipe and the two sets of slots in the saddles into which the sleeve-covered support rods fit.

With reference to the drawings, FIG. 1 depicts a see-through, flexible, "throw-away" trough sheet 10 with sleeves 11 disposed at its lengthwise ends, as can best be seen in FIG. 2. The sleeves 11 are designed to accommodate support rods 12 which are slidably placed into the sleeves by pushing the support rods in the direction of the horizontally placed arrows to a point where the support rods are centered an equal distance between two-sided tape 13a attached along both inside edges of the shortest ends of trough 10.

In preparing the flexible, "throw-away" trough sheet for installation around the asbestos covered pipe, a small piece of two-sided tape T is positioned along the inside radius of each saddle S to reduce or eliminate the risk of the saddle and trough from rotating on the asbestos covered pipe (ACP) when the trough is filled with water.

Figure 3:
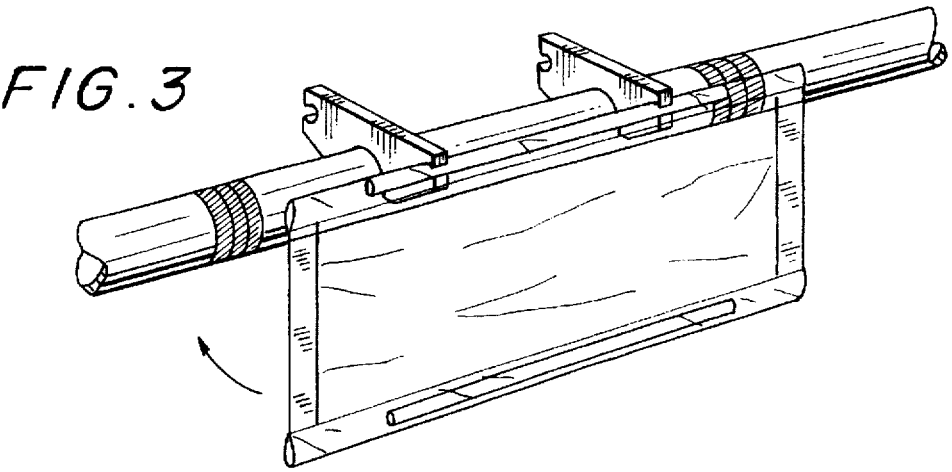
FIG. 3 is a view showing a sleeve-covered support rod press-fitted into the right-handed slots of the saddles, which are in placement over the innermost adherent contact points on the asbestos covered pipe.
Figure 4:
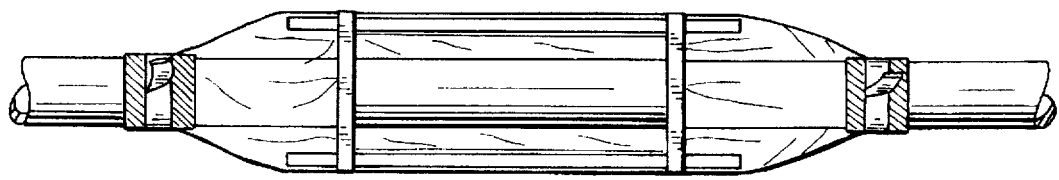
FIG. 4 is a top view of FIG. 1.
Figure 5:
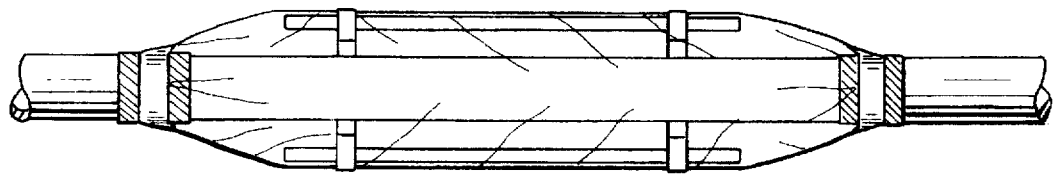
FIG. 5 is a bottom view of FIG. 1.
Figure 6:
FIG. 6 is a side view of FIG. 1.
Figure 7:
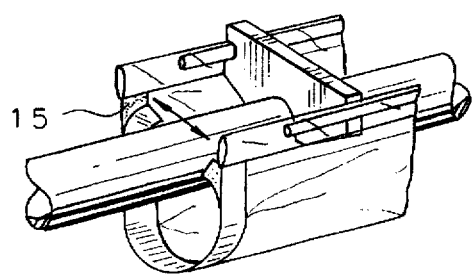
FIG. 7 is a cut-away view of the lightweight, flexible trough sheet positioned around an asbestos covered pipe except for the step of removing the covering from the two-sided tape on one inside edge of the trough prior to attaching the sticky trough tape to the sticky tape already on the asbestos covered pipe to form a complete seal.
Figure 8:
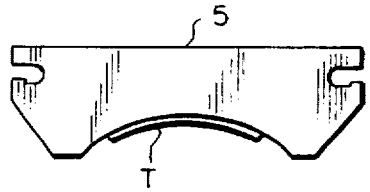
FIG. 8 shows a saddle with an arched-out semi-circular section having a piece of two-sided tacky tape positioned along the inside radius of the saddle to reduce the risk of the saddle and trough rotating on the asbestos covered pipe when the trough is filled with water.

During installation of the trough sheet about the asbestos covered pipe, the rectangular shaped trough containing the inserted support rods at equal distances between the two-sided tape positioned along the inside edges of the shortest ends of the trough is press-fitted into one side of saddle slots 14. Thereafter, the arched-out semi-circular portions of the saddle containing two-sided tape T along the inside radius of the arched-out semi-circle is positioned directly over the two innermost adherent contact points containing the two-sided tape on the asbestos covered pipe, as can best be seen in FIG. 3. The portion of the trough containing the support rod which is not yet press-fitted into slots in the saddle is then pushed in the direction shown by the arrow in FIG. 3 to press-fit the remaining sleeve-covered rod into the left hand slots in the saddle, to complete the process of forming a trough, short of the end sealing step.

Next, the covering or strip 15 on the two-sided tape on the inside edges of the trough is removed and the sticky or tacky portion of the two-sided tape on the inside edge of the trough is placed directly over the sticky or tacky portion of the outermost adherent spots on the asbestos covered pipe to affect a complete seal.

While the foregoing procedure provides a secure watertight seal, nevertheless, if desired, a stainless steel screw-clamp may also be placed over the outside edges of the trough directly over the taped end section in the event that water inside of the trough begins to migrate to the outside.

The trough is then filled with a sufficient amount of water containing an emulsifier such as Serpiflex® to increase the water penetration rate and reduce the soaking time needed to soften the asbestos to a point where it can be mechanically removed without risk of friable particles or fibers escaping into the air. While water leaks have not occurred during the soaking process, nevertheless, if any leaks begin to appear on either end of the trough, duct tape, cable ties, clamps and/or plumber's putty may be used alone or in combination in order to stop the leak.

After the asbestos covered pipe is soaked for a period ranging from a few minutes up to about one hour, to completely saturate, soften and loosen the asbestos, the asbestos covering is slit longitudinally with a retractable blade of a sheet rock knife (this slitting step may also serve to speed up the asbestos soak time and enhance the wetting process). Once the asbestos covered pipe is completely soaked, the asbestos material may be pushed down by hand using a glove so that the asbestos is pushed into the water beneath the pipe to permit the asbestos to soak for a few more minutes. Thereafter, the excess water is either vacuumed off or siphoned off and the soaked asbestos covered material is left in the bottom of the trough. Next, the saddles are dislodged from the pipe and any tape residue is removed prior to wiping the saddles clean. The saddles are then preserved for further use in removing asbestos from another section of covered pipe. Meanwhile, the trough sheet and its contents are cut away from the support rods, and the support rods are also preserved for use in conjunction with a fresh sheet and saddle to remove another section of asbestos covered pipe.

After the asbestos covering has been substantially completely removed with a plastic chisel or spatula, if need be, the pipe may be wiped with either a wet cloth or an oil soaked rag to ensure that any remnants of friable asbestos particles remaining intact on the pipe are removed. The foregoing process allows the contents of the flexible taped trough sheets as well as the trough itself to be dropped into an asbestos disposal bag, which is sealed for appropriate disposal according to environmental requirements.

An even faster method for removing the flexible trough sheet and disposing of the asbestos covered material may be accomplished after the excess water has been removed by vacuum or hand siphoned pump by positioning a disposal bag directly under the center of the trough. The trough is then slit along the bottom (from the inside) about 12" to 15", to allow the asbestos covered material to drop or be pushed directly into the disposal bag. The pipe and inside of the trough are then wiped clean with a moist or wet rag. The saddles and support rods are then removed from the empty trough, wiped clean and preserved for the next asbestos removal process. Each sealed end of the trough is then cut-away from the pipe, and both the empty trough and rags are deposited in the asbestos disposal bag, which is disposed of according to environmental regulations.

The invention process of asbestos abatement or removal using the flexible taped trough sheets enables asbestos contract removers to swiftly and economically remove or clean asbestos away from single or branched pipes, whether horizontally or vertically disposed, with a 50% or more reduction in labor costs over the glove bag removal techniques known in the prior art; where typically productivity using glove bags is 2 glove bags per hour on 4" to 6" pipe—or roughly 8 to 10 feet per hour.

With the flexible trough sheets of the invention, the equivalent of 5 to 6 glove bags per hour, or 20 to 25 feet per hour removal of asbestos is possible. Further, even higher production of asbestos removal is possible using the flexible trough sheets of the present invention, since the process time available through the use of these trough sheets permits additional troughs to be hung, and this hanging of additional trough sheets increases production of asbestos removal to about 30 to about 35 feet per hour.

The invention has been described in detailed specifics for purposes of illustration only, and it is to be understood that many changes in the intricacies of construction of the flexible trough sheet soaking devices of the invention can be made without departing from the invention scope, which is defined in the appended claims.

What is claimed is:

1. A trough soaking device for use in a process for complete wet removal of asbestos insulation covering and hazardous materials from pipes, joints, and valves comprising:

a flexible waterproof sheet material having disposed at its shortest ends, sealing means for placement about pre-formed outermost adherent contact points on an asbestos covered pipe, and sleeve means at its longest ends to accomodate insertable support rods;

a pair of support rods for insertion into a portion of said sleeve means; and at least a pair of saddles containing arched-out semi-circles for placement over pre-formed innermost adherent contact points on an asbestos covered pipe; and saddles containing slot means disposed at it length wise ends to accomodate press-fitting of support rods disposed in said sleeve means when said sealing means of said shortest ends of said waterproof sheet material are sealed together over said pre-formed outermost adherent contact points on said asbestos covered pipe.

2. The trough soaking device of claim 1, wherein said flexible waterproof sheet material is rectangular in shape.

3. The device of claim 2, wherein a two-sided adhesive material is positioned along an inside radius of said arched-out semi-circles of said saddles.

4. The device of claim 3, wherein said sealing means for placement about outermost adherent contact points on said asbestos covered pipe is two-sided adhesive tape.

5. The device of claim 4, wherein said innermost adherent contact points and said outermost adherent contact points on said asbestos covered pipe are two-sided adhesive tape.

6. The device of claim 5, wherein a spot beneath said preformed adherent contact points are treated with an encapsulant prior to formation of said preformed adherent contact points.

7. In combination, the device of claim 1 sealed around an asbestos covered pipe.

8. A process for complete wet removal of asbestos insulation covering and hazardous materials from pipes, joints and valves comprising:

providing pre-formed adherent material as contact points on an asbestos covered pipe; placing two-sided adhesive material over said contact points; inserting a pair of support rods into a portion of sleeve means disposed at the longest ends of a waterproof sheet material; placing a piece of two-sided adhesive material along an inside radius of an arched-out semi-circle in at least a pair of saddles to be placed over innermost adherent contact points on said asbestos covered pipe; press-fitting said sleeve covered support rods into slots disposed at lengthwise ends of said saddles; placing the inside radius of said arched-out semi-circle in each saddle to fit over a pair of pre-formed adherent contact points on said asbestos covered pipes; placing sealing means disposed at the shortest ends of said waterproof sheet material over a different pair of pre-formed adherent contact points on said asbestos covered pipe to secure the waterproof sheet material in a trough arrangement about said asbestos covered pipe; placing a sufficient volume of water containing an emulsifier into the sealed, in place, lightweight, flexible, "throw-away" trough to completely immerse the asbestos covered pipe; soaking the asbestos covered pipe for a period sufficient to loosen the asbestos; slitting the asbestos covering longitudinally along the pipe length to allow the asbestos to fall-off into the trough; and vacuuming or siphoning off excess water so that only soaked asbestos remains for disposal.

9. The process of claim 8, wherein said soaked asbestos remains is removed by: placing a disposal bag underneath said trough sheet; slitting the trough sheet along the bottom from the inside to allow said soaked asbestos to drop into said disposal bag;

wiping the pipe substantially free from asbestos with a moist or wet rag; removing the saddles and support rods from the empty trough; wiping the saddles and support rods clean with a wet cloth and preserving them for future use; and disposing of the bag containing the soaked asbestos.

* * * * *